Sept. 16, 1958  J. A. STEDMAN  2,851,781
MICROMETER CALIPER CONSTRUCTION
Filed Oct. 24, 1955

INVENTOR.
James A. Stedman
BY
Nathaniel Frucht
Atty.

United States Patent Office 2,851,781
Patented Sept. 16, 1958

2,851,781
MICROMETER CALIPER CONSTRUCTION

James A. Stedman, Cranston, R. I., assignor to The Central Tool Company, a corporation of Rhode Island Application October 24, 1955, Serial No. 542,226

3 Claims. (Cl. 33—164)

The present invention relates to precision measuring tools, and has particular reference to a novel construction for a micrometer caliper.

The principal object of the invention is to provide a simple micrometer caliper assembly which may be readily adjusted to compensate for wear on the faces of the anvil and spindle and on the threads of the spindle and barrel.

Another object of the invention is to provide a manually controlled thimble release which enables the thimble of a micrometer caliper to be moved axially and turned for obtaining an accurate zero setting at all times.

A further object of the invention is to provide a thimble adjustment for zero reading which may be set by use of a screw driver or a small coin, and does not require special wrenches or the like.

The above and other objects and advantageous features in view are more fully disclosed hereinafter in the detailed description following, in conjunction with the accompanying drawings, and are more specifically defined in the claims appended thereto.

It has been found desirable to provide a micrometer caliper with simple means for adjusting the thimble to reset the zero mark, whereby wear between the faces of the anvil and spindle and between the threads of the spindle and barrel is readily compensated for. To this end, I mount the thimble loosely in concentric relation to the barrel, and I releasably lock the thimble to the spindle through a hardened and tempered split tapered ring which is readily moved to thimble-spindle gripping and releasing positions by means of a manually movable screw and an associated cone element.

Figure 1:
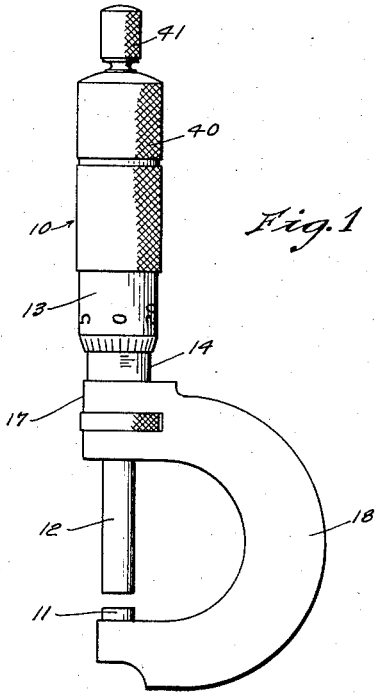
Fig. 1 is a side view of an illustrative micrometer caliper equipped with my invention.
Figure 2:
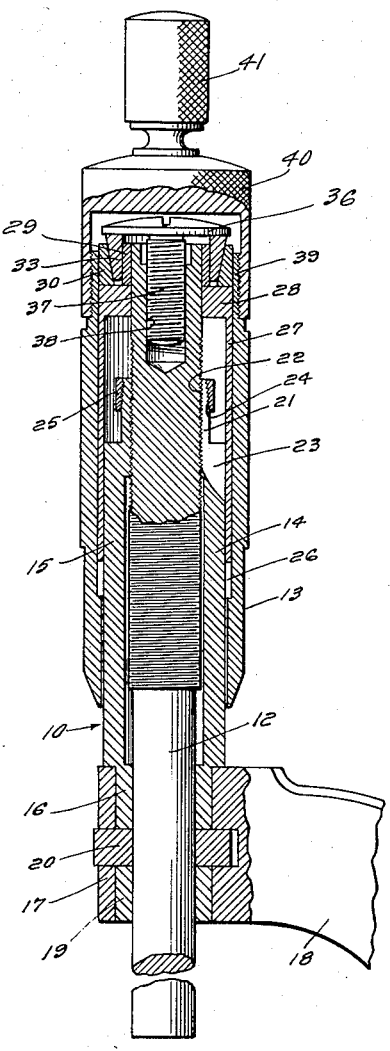
Fig. 2 is an enlarged detail section, partly broken away, of the thimble and barrel assembly thereof.
Figure 3:
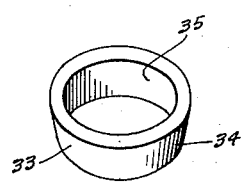
Figs. 3 and 4 are respectively perspective views of the thimble lock ring parts.
Figure 4:
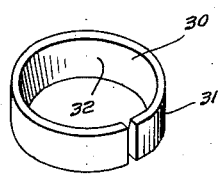

Referring to the drawings, the illustrative micrometer caliper 10 is of the C type, and includes an anvil 11, a spindle 12, a thimble 13, and a barrel 14, see Fig. 2. The barrel 14 includes a cylindrical body 15 with a lower circular flange 16 of reduced diameter to seat within the upper bushing 17 of the C-shaped anvil frame 18, a lower cylindrical bearing 19 and a loosely mounted split lock ring 20 of known type and forming a vertical channel for the spindle 12.

The upper end 21 of the barrel is of reduced diameter and is internally threaded as indicated at 22; its upper end and the contiguous barrel portion have segments with equi-spaced vertical slots 23, preferably three in number, the upper end tapers, as illustrated, and is provided with outer threads 24, whereby an internally threaded adjustment ring 25 may be moved down over the threads 24 to draw the upper segments radially inwardly. The spindle 12 has an upper portion which is externally threaded to engage with the barrel threads 22, whereby rotation of the spindle raises and lowers the spindle in customary fashion.

The thimble 13 is vertically recessed as indicated at 26 to provide a cylindrical space for a sleeve 27 which has a transverse top 28 with a central opening receiving the upper end of the spindle, and an upper cylindrical flange 29 which is force pressed on the upper spindle end. A split conical washer 30 having an outer vertical surface 31 and an inner inwardly inclined surface 32 is loosely seated on the top 28 for spreading lock engagement by a conical washer 33 having an outer inclined surface 34 and a vertical inner surface 35, the washer 33 being pressed down by a screw head 36 which has a depending screw 37 threaded into a correspondingly threaded vertical seat 38 in the upper end of the spindle. The upper end 39 of the thimble is in spaced relation to the sleeve flange 29, thus providing an annular recess for the washers 30, 33 and is set back and threaded to detachably receive a cover cap 40 provided with a manually engageable knurled knob 41 for turning the barrel.

The connection between the thimble and the spindle is thus through the two interengaging washers, which are triangular in cross section and thus exert a binding pressure when pressed by the screw head. Wear on the anvil and spindle faces, or on the spindle and barrel threads, is readily compensated for; the cap 40 being removed, the screw head 36 is loosened, whereby the thimble may be shifted axially and rotatively to reset the zero point, and the new zero setting is then locked in place by tightening the screw head.

Although I have disclosed a specific embodiment of my invention, it is obvious that changes in the size, shape and arrangement of the parts may be made for the resetting adjustment of different types of micrometer calipers, without departing from the spirit or the scope of the invention as defined in the appended claims.

I claim:

1. In a micrometer caliper, a barrel having its upper end internally threaded, a spindle having a threaded portion seated in the barrel threads, a sleeve extending over the barrel and having its upper end secured to the spindle in axially spaced relation to the barrel upper end, a thimble rotatably and axially movable on the sleeve and having its upper portion in radially spaced relation to the sleeve upper end thereby forming an annular recess therebetween, and releasable lock means in said recess for locking the thimble and spindle upper portions.

2. In the structure of claim 1, said lock means including a split conical washer and an associated conical washer, and means for pressing the washers together to expand the split washer.

3. In the structure of claim 2, said pressing means including a screw threadedly mounted in the spindle upper end.

References Cited in the file of this patent

UNITED STATES PATENTS 1,629,406   Parker _____ May 17, 1927

FOREIGN PATENTS 455,346   Italy _____ Feb. 22, 1950
246,285   Switzerland _____ Sept. 16, 1947